United States Patent [19]

Saito

[11] Patent Number: 5,440,438
[45] Date of Patent: Aug. 8, 1995

[54] DISC DRIVE APPARATUS

[75] Inventor: Hitoshi Saito, Kanagawa, Japan

[73] Assignee: Sony Corporation, Tokyo, Japan

[21] Appl. No.: 220,300

[22] Filed: Mar. 30, 1994

[30] Foreign Application Priority Data

Mar. 31, 1993 [JP] Japan .................................. 5-074398
Mar. 31, 1993 [JP] Japan .................................. 5-074399

[51] Int. Cl.[6] .............................................. G11B 5/55
[52] U.S. Cl. ...................................... 360/106; 360/109
[58] Field of Search ............ 360/106, 105, 109, 78.12, 360/78.04

[56] References Cited

U.S. PATENT DOCUMENTS

| 4,694,366 | 9/1987 | Fuke | 360/109 |
| 4,766,510 | 8/1988 | Okita et al. | 360/106 |
| 4,875,120 | 10/1989 | Takahashi et al. | 360/106 |
| 5,189,569 | 2/1993 | Kurosawa | 360/109 X |
| 5,198,946 | 3/1993 | Kurosawa | 360/105 |
| 5,212,417 | 5/1993 | Nagai et al. | 360/106 X |

FOREIGN PATENT DOCUMENTS 2147728  5/1985  United Kingdom ................. 360/106

Primary Examiner—John H. Wolff
Attorney, Agent, or Firm—Limbach & Limbach; W. Patrick Bengtsson

[57] ABSTRACT

In a disc drive apparatus, a contactor which receives a rotating force of a screw axle is integrally formed with a head carriage. Therefore, since the contactor is formed when the head carriage is formed, the mounting of the contactor on the head carriage is unnecessary during an assembly of the head. A plate spring is mounted on the head carriage, the plate spring having a first spring portion which presses the outer periphery of the guide axle on an inner peripheral surface of a guide axle and a second spring portion which presses the contactor on the outer peripheral surface of an output axle. Therefore, since the first spring portion and second spring portion are elastically deformed and the head carriage is held with respect to the guide axle and output axle, a single plate spring can obtain a necessary pressure of contact for transmitting the driving force of the motor and balance of a head assembly. In addition, a spring mounting piece is integrally formed on a press plate. The spring mounting piece is provided for mounting thereon a winding portion of a torsion spring which swingably biases a head arm in a direction such that a second head approaches a first head. Thus, the number of parts and labor hour of assembly can be reduced.

17 Claims, 9 Drawing Sheets

DISC DRIVE APPARATUS

BACKGROUND OF THE INVENTION

1. Field of the Invention

The present invention relates generally to a structure of a disc drive apparatus, for example, suitable for a floppy disc drive apparatus.

2. Description of Prior Art

Recently, a disc drive apparatus such as a floppy disc drive apparatus has remarkably and widely been used in a commercially available personal computer, office computer, word processor, and so on.

FIG. 10 shows a structure of a kind of the disc drive apparatus previously proposed.

As shown in FIG. 10, a chassis denoted by 1 is provided in which a spindle of a motor 2 serving as a center of rotation of a disc is built in. For example, the chassis 1 is housed in a frame of equipment (not shown) of, e.g., a personal computer. The whole chassis 1 is open toward its forward direction and is formed of a box having a bottom end and having a housing space 1a to which a disc cartridge 3 is exposed. A retaining wall 4 and a supporting axle 5 are vertically extended from a rear right side portion of the bottom end of the chassis 1 as viewed from FIG. 10. The retaining wall 4 is provided with a penetrated hole 4a which opens in the forward and rearward directions and the supporting axle 5 is juxtaposed to the retaining wall 4 with a predetermined interval of distance therebetween. Two spring engagement/stop pieces 6 are projected from forward ends of the chassis 1 and juxtaposed to each other with predetermined interval of distance in respective rightward and leftward directions.

A plurality of guide grooves 7 (in FIG. 10, only two guide grooves in the left side are shown) extending upward and downward directions are integrally mounted on both side walls of the chassis 1.

Two pairs of projectors 8 and 9 are juxtaposed respectively to each other with predetermined intervals of distances in the forward and rearward directions of the chassis 1.

The two pairs of projectors 8 and 9 are mounted on the bottom end of the chassis 1 and are so constructed as to enable a sliding plate to be described later to be guided in the forward and rearward directions. One of each pair of projectors 8 and 9 is juxtaposed to the other of each pair of projectors 8 and 9 with the predetermined interval of distance in the rightward and leftward directions.

A cartridge positioning portion 9a having a conical shape is installed in each of rear-sided pair of projectors 9, whose outer diameter is such as to become smaller as the portion 9a advances to its tip.

A sliding plate 10 having a letter C-shaped cross section is provided with an "eject" button 11 which is pushed to ON to eject the disc cartridge 3 from the plate 10, the eject button 11 being placed at a right side portion of a forward end edge of the plate 10.

The sliding plate 10 includes: a bottom surface plate 12 having a cut-out 12a of a totally U shape viewed from the top of the chassis 1 to which the spindle of the motor 2 is exposed and having a first elongated hole 12b to which the spring engagement/stop piece 6 is exposed; and two side plates 13 extended at both side portions of the plate 10 and opposing to each other with a predetermined interval of distance. The two side plates 13 are so constructed in the chassis 1 as to be enabled to be advanced and retracted in the chassis 1.

A cut-out 14 and a spring engagement/stop hole 16 are disposed on the bottom surface plates 12 of the sliding plate 10. The cut-out 14, to which the respective pairs of projectors 8 and 9 are exposed, is extended in the forward and rearward directions. The spring engagement/stop hole 16 corresponds to a second elongated hole 15 and the spring engagement/stop piece 6. In addition, a lock pawl 17 is installed which is projected downward at the rear side edge of the bottom plate 12 of the sliding plate 10.

On the other hand, front, rear, right, and left cam grooves 18 are formed on the bottom surface plate 12 of the sliding plate 10, each having a gradient obliquely raised in the forward directions and a rack 19 is provided at the rear position of the left cam groove 18, the rack 19 being extended in the forward and rearward directions.

Two coil springs 20 bias the sliding plate 10 in the forward direction and have both ends which are engaged with the respective spring engagement/stop piece 6 and respective spring engagement/stop hole 16.

A trigger arm 21 has an engagement surface 21a and a guide surface 21b which are opposed to the lock pawl 17. The trigger arm 21 is pivotally disposed on the supporting axle 5 and an arm operator 22 is integrally mounted on an upper end surface of the trigger arm 21, the arm operator 22 being provided with a tongue 22a projected toward a side of the trigger arm 21 so as to be engaged with a spring to be described later.

A torsion spring 23 is biased to pivot the trigger arm 21 in a direction at which the sliding plate 10 is engaged, its winding portion of the torsion spring 23 is mounted at a peripheral side of the supporting axle 5, and its both ends are engaged and stopped at the tongue 22a and retaining wall 4.

A stepping motor 24 for a head carriage feed is fixed on a rear end portion of the chassis 1. An output axle 25 of the stepping motor 24 is extended in the forward and rearward directions and is formed with a reed screw axle extended in the forward and rearward directions and having a V-shaped groove 25a in a spiral form, its tip being supported via a bearing (not shown) within the penetrated hole 4a of the retaining hole 4.

A guide axle 26 extended in the forward and rearward directions is retained on a rear center portion of the chassis 1 and is so constructed as to guide a head carriage to be described later in the forward and rearward directions.

A head carriage 27 is provided with a needle pin 28 and a plate spring 29 by means of which the needle pin 28 is brought in close contact within the V-shaped groove 25a of the output axle 25 under pressure, and is held so as to be enabled to be advanced and retracted in the upward direction of the chassis 1, and an axial hole 27a (shown in FIG. 11) is provided at the right-and-lower side of the head carriage 27 through which the guide axle 26 is penetrated via a bushing B (shown in FIG. 11). A first head 30 to read a recorded information on the disc is held on an upper end of the head carriage 27 and a head arm 32 having a second head 31 corresponding to the first head 30 is swingably attached onto a rear-and-upper side of the head carriage 27 via an elastic material 33.

The head arm 32 is pivotally biased by means of the torsion spring 34 in a direction at which the second head 31 approaches the first head 30 and is integrally mounted with a stopper 32a used to limit the pivotal movement of the head arm 32 and which is projected toward a side of the head arm 32 from a side end edge of the head arm 32 (as shown in FIG. 12).

A cartridge holder 36 is installed within the sliding plate 10 so as to be enabled to be moved in the upward and downward directions. The cartridge holder 36 removably holds the disc cartridge 3 so as to be enabled to be inserted into or drawn from the cartridge holder 36.

A roller 37 is rotatably held on both side ends of the cartridge holder 36. The roller 37 having its recess is exposed to the respective cam grooves 18 and guide grooves 7. A vertical tongue 38 is installed at a side edge of the upper end of the cartridge holder 36. The vertical edge 38 is provided with an engagement/stop hole 38a which opens in both side directions of the vertical edge 38. Then, the cartridge holder 36 is so constructed as to engage or release the lock pawl 17 and engagement surface 21a to or from each other under a pressing force (pressure) of the disc cartridge 3 against the arm operator 22, thus approaching the bottom end plate 12 by means of the rearward movement of the sliding plate 10 under the pressing force (pressure) from the eject button 11 and being spaced apart from the bottom surface plate 12.

An arm 39 which opens and closes a shutter 3a of the disc cartridge 3 is pivotally mounted on a side edge of the rear-and-upper side of the cartridge holder 36. The arm 39 is integrally formed with an engagement/stop piece 40 which is projected upward.

A coil spring 41 pulls the arm 39 so as to provide a return characteristic for the arm 39 and has both ends which are engaged to the engagement/stop piece 40 and engagement/stop hole 38a.

Switches 42 and 43 are mounted on the chassis 1 via a p.c. board 44 for detecting kinds of discs D (for example, 2DD, 2HD, or 3ED) and for detecting permission or disablement of writing onto the disc (not shown), respectively.

A speed-reduction gear mechanism 45 is disposed on a side edge of the rear end portion of the chassis 1. The speed-reduction gear mechanism 45 is provided with a gear 46 which meshes with the rack 19.

Furthermore, positioning recesses 47 and 48 are provided in a casing 3b of the disc cartridge 3, through which the respective projectors 9 get into or get off the casing 3b.

Anyway, a head alignment of the head assembly in the kind of the disc drive apparatus shown in FIG. 10 is carried out as follows:

That is to say, a jig (not shown) used to adhere a head chip and having two supporters (not shown) is prepared, one of the two supporters of the jig being inserted into the bushing B of the head carriage 27 shown in FIG. 11 and the needle pin 28 being mounted on the other supporter so that the head alignment is carried out with a degree of parallel (juxtaposition) maintained.

In this case, a vertical distance shown in FIG. 11 between the one supporter (a horizontal center line of the bushing B) and the other supporter (a supported point of the needle pin 28) is set to 6.30 mm.

However, since in the head assembly of the disc apparatus shown in FIG. 10 has the head carriage 27 and needle pin 28 which are respectively formed of a synthetic resin and stainless steel, it is necessary to mount the needle pin 28 on the head carriage 27 during its assembly of the head. Consequently, numbers of mounting steps in the head assembly are increased and the assembly cost of the disc drive apparatus becomes high as described above.

Furthermore, in the kind of the disc drive apparatus shown in FIG. 10, the needle pin 28 is pressurized and brought in close contact with an outer peripheral surface of the output axle 25 by means of the plate spring 29 and an inner peripheral surface of the bushing B is brought in close contact with the outer peripheral surface of the guide axle 26 by means of the torsion spring S, as shown in FIG. 11 in order to secure a transmission of a driving force of the stepping motor 24 and maintain a magnitude of balance of a head assembly of the disc drive apparatus. Therefore, two springs (namely, the plate spring 29 and torsion spring S) are needed.

Consequently, an assembly labor-hour cost as well as number of assembly parts are required so that a assembly cost of the disc drive apparatus becomes high as a total.

Still furthermore, since, in the head assembly of such a kind of the disc drive apparatus as described above, the head arm 32 is swingably held on the head carriage 27 and the head arm 32 is pivotally biased in the direction such that the second head 31 approaches the first head 30, two parts of the press plate P to integrate the head carriage 27 and head arm 32 and of the spring mounting pieces S to mount the torsion spring 34 onto the head carriage 27 are required. Consequently, the labor-hour of assembly is increased as well as the number of parts to be assembled so that the assembly cost becomes high as the total.

SUMMARY OF THE INVENTION

It is therefore a principal object of the present invention to provide a disc drive apparatus which can reduce the number of assembled parts of the apparatus and labor-hour cost of assembly thereof, and can achieve a reduction in its assembling cost.

The above-described object can be achieved by providing a disc drive apparatus having a head carriage which is advanced and retracted in response to a drive of a motor, said disc drive apparatus comprising: a) a screw axle which is rotated in response to the drive of the motor; and b) a contactor which is integrally formed with said head carriage and which is in contact with said screw axle so that said contactor receives a rotating force of said screw axle, thus said head carriage being advanced and retracted.

DESCRIPTION OF THE PREFERRED EMBODIMENTS

Figure 10:
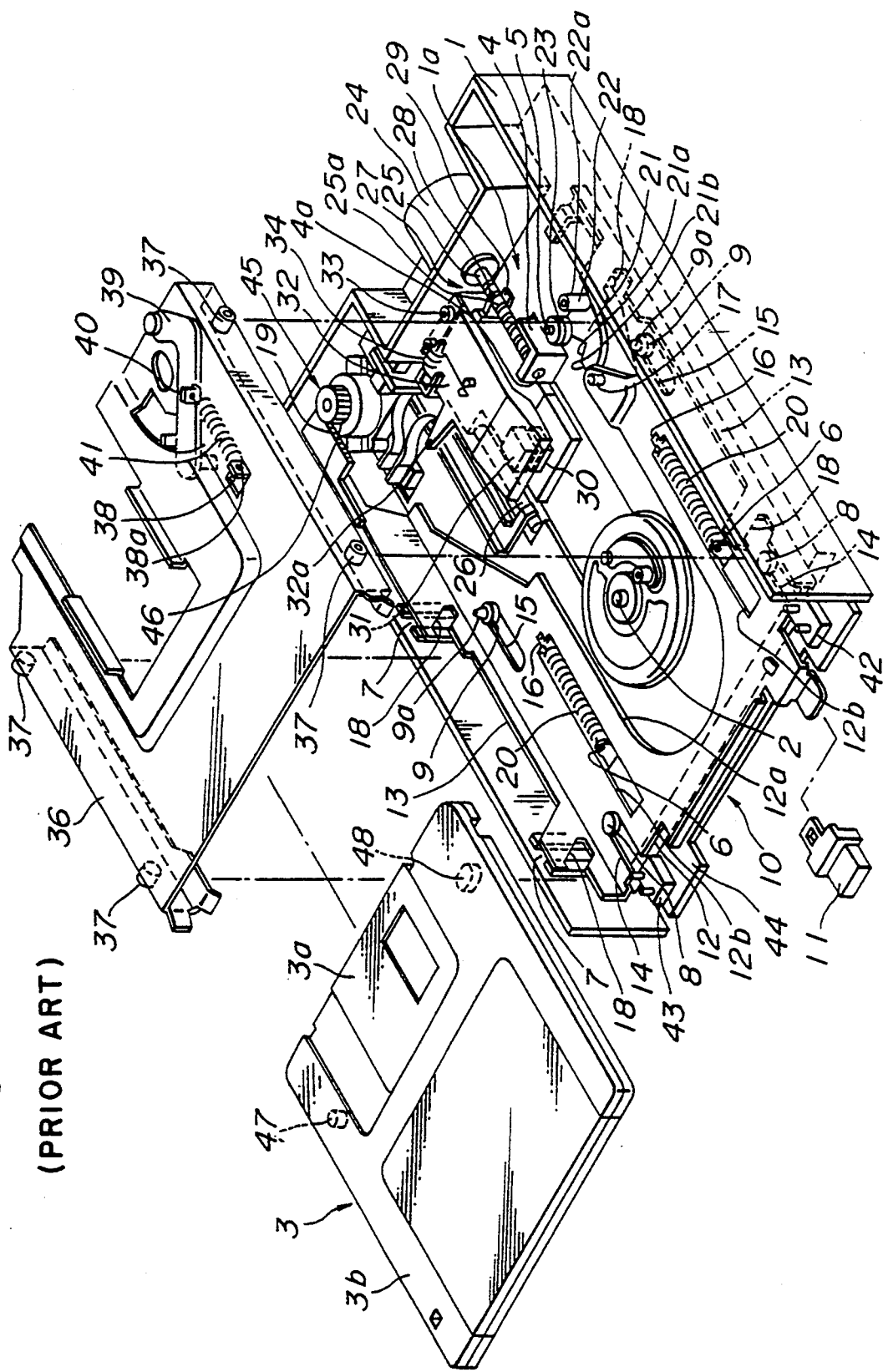
FIG. 10 is an exploded perspective view of a disc drive apparatus explained in the BACKGROUND OF THE INVENTION.
Figure 11:
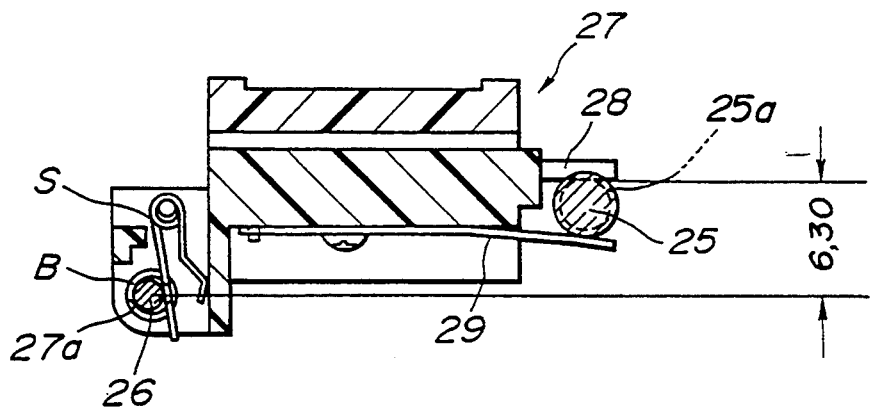
FIG. 11 is a cross sectional view of a holding state of a head carriage of the disc drive apparatus shown in FIG. 10.
Figure 12:
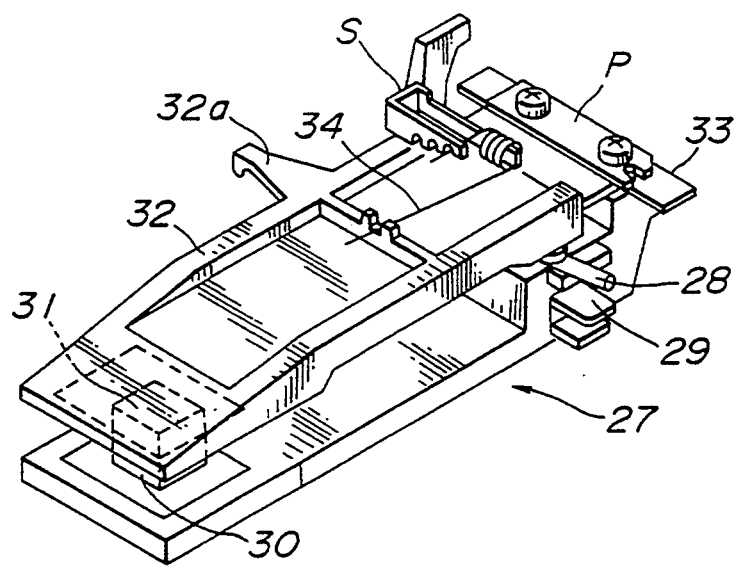
FIG. 12 is a perspective view of a head assembly in the disc drive apparatus shown in FIG. 10.

FIGS. 10 through 12 have already explained in the BACKGROUND OF THE INVENTION.

Figure 1A:
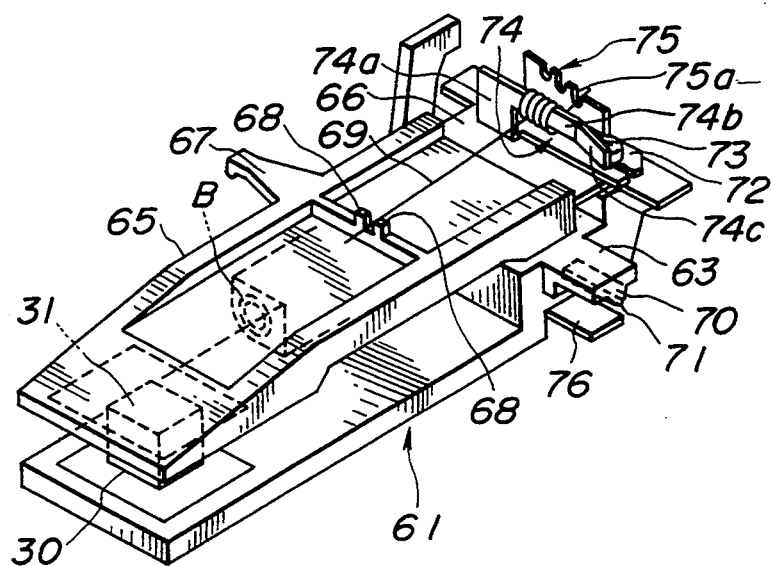
FIGS. 1 (A) and 1 (B) are perspective view and cross sectional view of a head assembly of a disc drive apparatus according to the present invention, respectively.
Figure 1B:
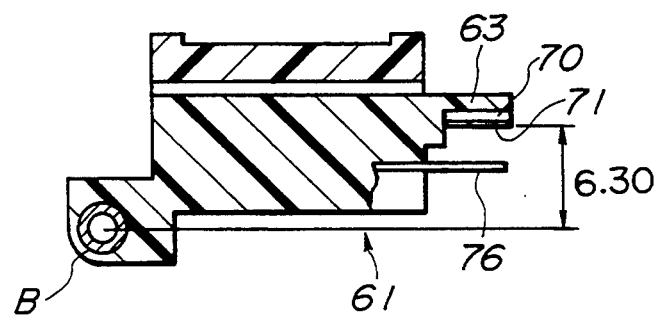

FIGS. 1 (A) and 1 (B) show perspective view and cross sectional view of a head assembly in a disc drive apparatus according to the present invention.

Figure 2:
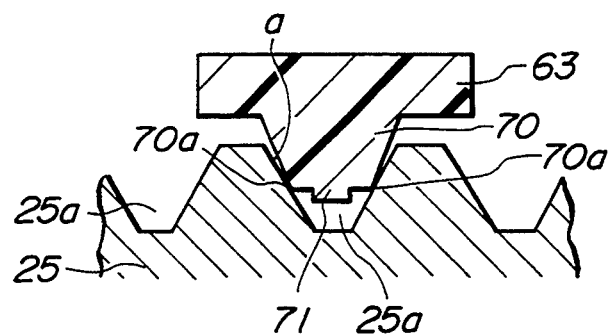
FIG. 2 is a cross sectional view of a contactor of the head assembly engaged with a screw axle in the disc drive apparatus shown in FIGS. 1 (A) and 1 (B).

FIG. 2 shows a cross sectional view of an engaged state of a contactor and screw axle of the head assembly of the disc drive apparatus according to the present invention.

As shown in FIGS. 1 (A), 1 (B), and 2, a head carriage 61 made of a synthetic resin is advanced and retracted in response to a drive of the stepping motor 24 described in the BACKGROUND OF THE INVENTION. The head carriage 61 is mounted on an upper end of the chassis 1 and is retained on the guide axle 26 described in the BACKGROUND OF THE INVENTION via the bushing B so as to be enabled to be advanced and retracted. A first head 30 is retained on a tip upper surface of the head carriage 61 which carries out a read of a recorded information on the disc and an extension piece 63 projected toward a right side is integrally formed on a rear-and-right side end portion of the head carriage 61. A head arm 65 is swingably mounted via an elastic body 66 and is provided with a second head 31 corresponding to the first head 30 at a rear-and-right side end portion of the head carriage 61.

A stopper 67 projected toward the left side and used to limit the pivotal movement of the arm 32 is integrally formed on a left-side end edge. Two spring engagement/stop portions 68 are integrally formed on a center portion in a width direction at the upper end surface and opposed against each other with a predetermined interval of distance therebetween in the right and left directions. The head arm 65 is pivotally biased by means of a torsion spring 69 in a direction at which the second head 31 approaches the first head 30.

A contactor 70 having an inverted trapezoid shape in cross section is integrally formed on a lower end surface of the projecting piece 63. The contactor 70 has corner portions 70a to be engaged to a grooved wall 25a of a read screw rod 25 and to be exposed to the V-shaped groove 25a. The drive of the stepping motor 24 causes a rotation force of the output axle 25 to be exerted on the contactor 70. A projecting portion 71 which is seatable onto a jig (not shown) used to adhere a head chip is integrally formed on a lower end surface of the contactor 70. Hence, a vertical distance from one of two supporters of the chip adhering jig (the horizontal center line of the bushing B) to the other supporter (supported point of the projecting portion 71) is set to 6.30 mm. The contactor 70 has a surface treated under the application of fluoride liquid together with the projecting portion 71.

A press plate 72 having a rectangular shape in a plan view is fixed on a rear-and-upper end surface of the head carriage 61 by means of a via 73 via the elastic material 66.

A left side portion of a front end edge of the press plate 72 is integrally formed with a spring mounting piece 74 having a rising portion 74a projected upward, a spring mounting portion 74b which is projected toward a right side of the rising portion 74a, and a spring guide portion 74c which is bent toward a head side from the spring mounting portion 74b.

A spring engagement/stop piece 75 is bent at a center portion of a rear end edge of the press plate 72. The spring engagement/stop piece 75 has a plurality of spring engagement/stop grooves 75a which correspond to the spring engagement/stop portion 68. The spring engagement/stop piece 75 is opposed to the spring mounting portion 74b of the spring mounting piece 74.

A plate spring 76 presses the contactor 70 so as to be brought in close contact with the groove wall a of the V-shaped groove 25a under pressure, a part of the plate spring 76 being opposed to the extension piece 63 so as to be fixed to an inverted side of a rear end portion of the head carriage 61.

In the head assembly thus constructed as described above, the contactor 70 which receives the rotating force of the output axle 25 is formed during the formation of the head carriage 61.

Hence, since, in the embodiment described above, it is not necessary to mount the contactor 70 on the head carriage 61 during the head assembling operation, the number of steps of mounting this head assembly can be reduced.

The fact that the projecting portion 71 is formed on the contactor 70 means that a reference portion (projecting portion 71) of the head alignment can be set to a predetermined position. That is to say, the vertical distance from one supporter (horizontal center line of the bushing B) of the two supporters of the head chip adhering jig (not shown) to the other supporter during the head alignment operation can be set to a size of 6.30 mm as in the same way as shown in FIG. 11 described in the BACKGROUND OF THE INVENTION.

In the embodiment described above, since the surface of the contactor 70 is treated with the Fluorine liquid applied thereon, a wear-out of the surface of the contactor 70 can be prevented due to its long term use. Hence, a material of the head carriage 61 can be selected with only the characteristic (temperature characteristic etc.) of the head carriage 61 taken into consideration.

Figure 3:
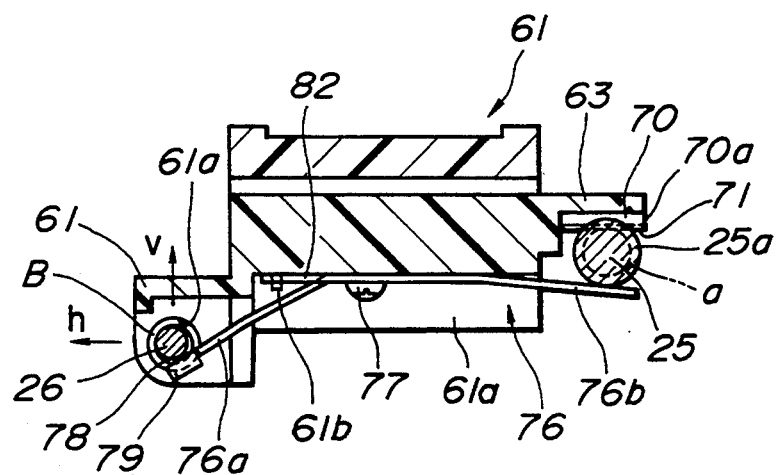
FIG. 3 is a cross sectional view of a holding state of a head carriage in the disc drive apparatus according to the present invention.
Figure 4:
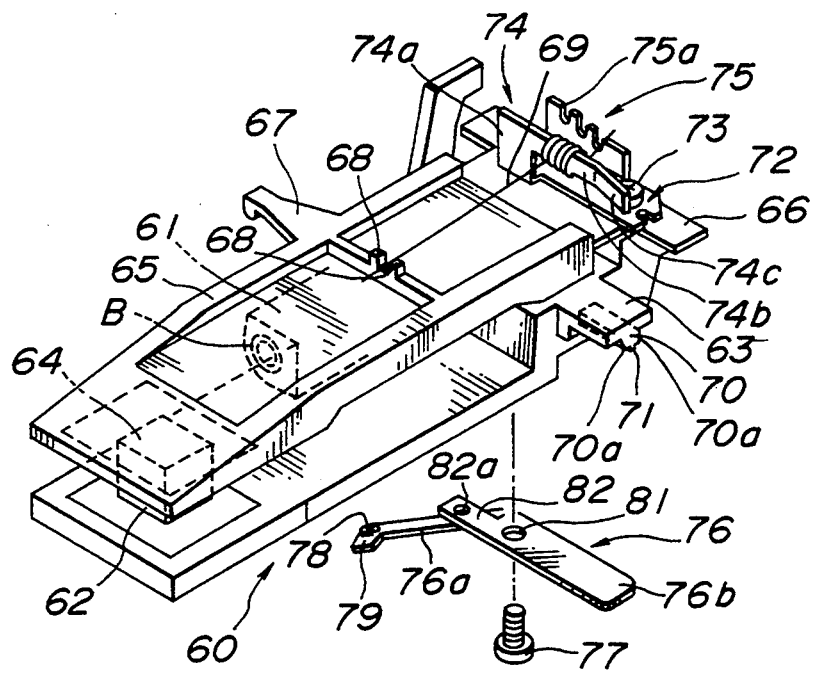
FIGS. 4 (A) and 4 (B) are perspective views of the head assembly in the disc drive apparatus according to the present invention.
Figure 4:
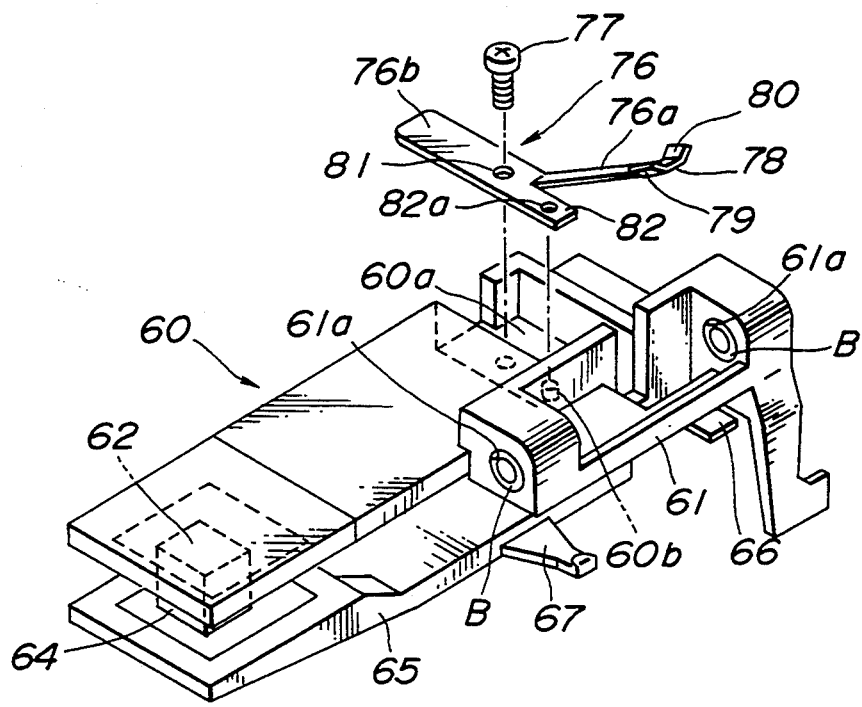
Figure 5:
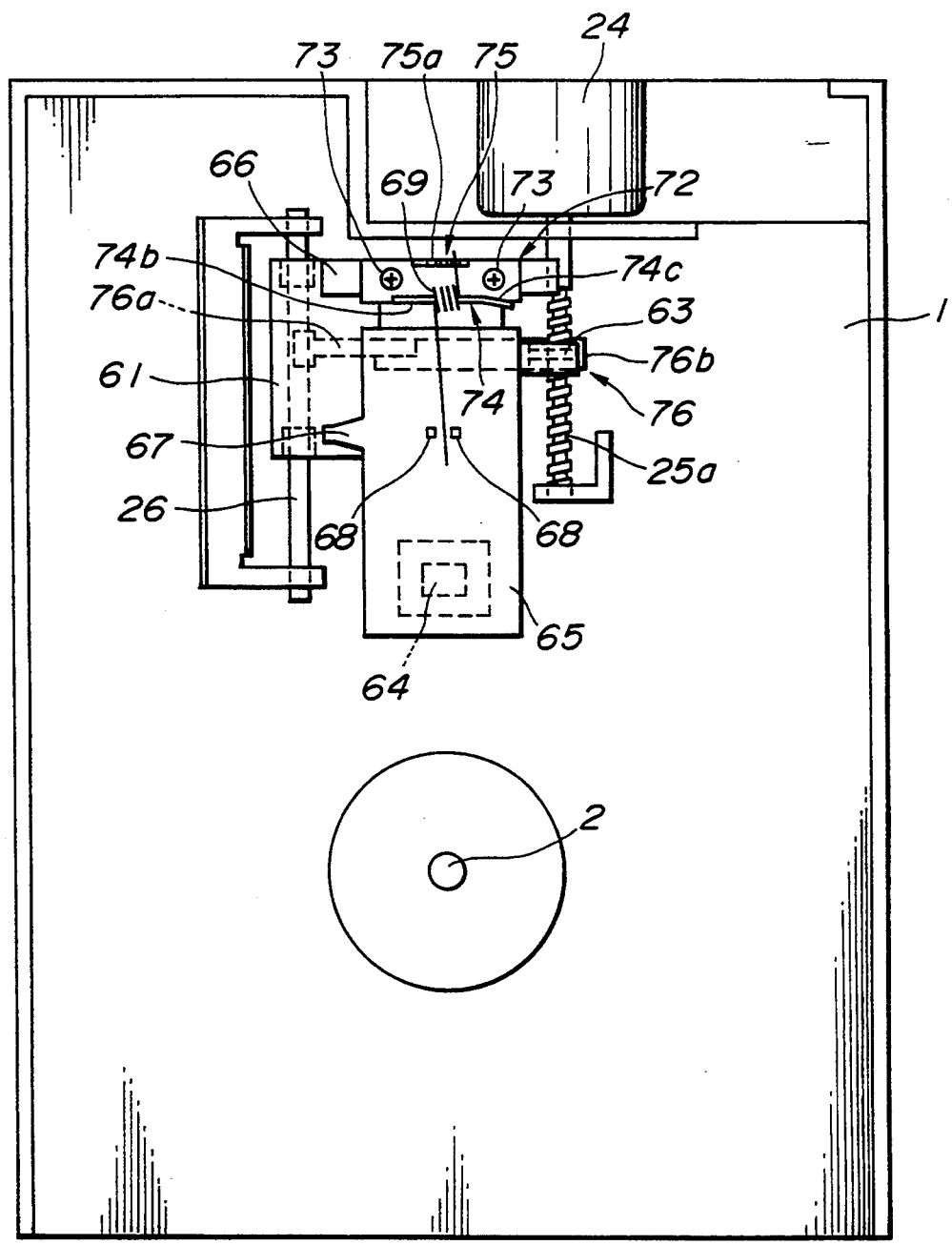
FIG. 5 is a plan view of a mounting state of the head assembly in the disc drive apparatus.
Figure 6A:
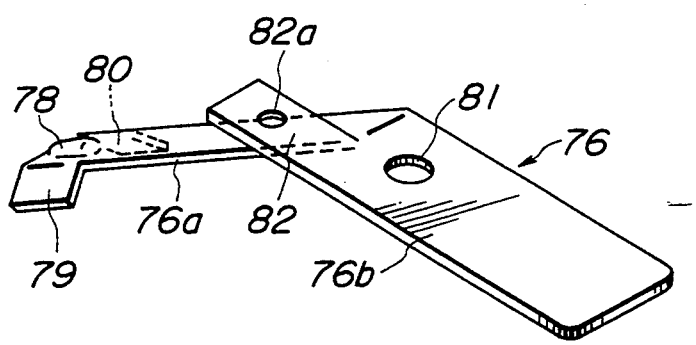
FIGS. 6 (A) and 6 (B) are perspective view and cross sectional view of a plate spring in the disc drive apparatus according to the present invention.
Figure 6B:
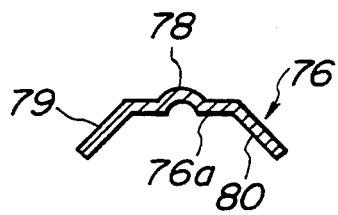
Figure 7A:
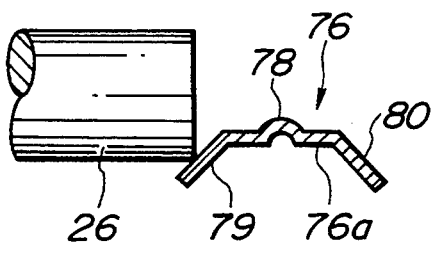
FIGS. 7 (A) and 7 (B) are cross sectional views of the plate spring which is elastically deformed in a case when a guide axle is inserted through the head carriage in the disc drive apparatus according to the present invention as viewed obliquely from an upward direction of the head assembly.
Figure 7B:
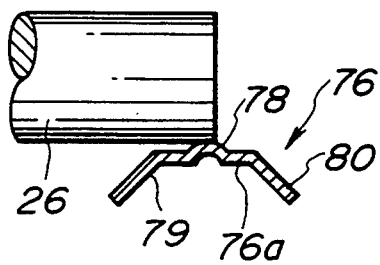

FIG. 3 shows a longitudinal cross sectional view of a head carriage of the disc drive apparatus according to the present invention which is in a holding state. FIGS. 4 (A) and 4 (B) show perspective views of a head assembly of the disc drive apparatus in the embodiment shown in FIG. 3. FIG. 5 shows a plan view of the head assembly which is in a mounted state in the disc drive apparatus according to the present invention. FIGS. 6 (A) and 6 (B) are perspective and cross sectional views of the plate spring of the disc drive apparatus according to the present invention.

A retainer 61 having an axial hole 61a into which the guide axle 26 is inserted via the bushing B and which is opened to the forward and rearward directions (carriage advance and retracted directions) of the head carriage 61 is integrally mounted on a lower-and-left side portion thereof. A recess 60a and a positioning tongue 60b are formed on a rear end portion of the head carriage 61. The recess 60a is opened toward the lower side portion thereof. A recess 60a and a positioning tongue 60b are formed on a rear end portion of the head carriage 61. The recess 60a is opened toward the lower and right-and-left sides of the head carriage 61. The positioning tongue 60b is projected downward from the bottom end (lower end) within the recess 60a. It is noted that the first head 30 to read the recorded information on the disc 3 is held on a tip of the head carriage 61 and an extension piece 63 is integrally formed on a rear-and-right side portion of the head carriage 61 which is projected toward a right side of the head carriage 61.

A head arm 65 having the second head 31 corresponding to the first head 30 is swingably mounted on a rear-and-upper end of the head carriage 61 via the elastic body 66.

A shown in FIG. 3, a plate spring 76 having an approximately < shape in cross section includes a first spring portion 76a whose ti is exposed within the retaining assembly 61 and which pressurizes and brings an outer peripheral surface of the guide axle 26 in close contact with an inner peripheral surface of the bush B in two directions of a horizontal direction h and vertical direction v and a second spring portion 76b whose tip is opposed to the projecting piece 63 together with the tip of the first spring portion 76a and which pressurizes and brings the contactor 70 in close contact with an outer peripheral surface of the output axle 25 (the groove wall a of the V-shaped groove 25a). The plate spring 76 is fixed on a bottom surface of the recess 60a via a vis 77.

A tongue 78 which is brought in contact with an outer peripheral surface of the guide axle 26 is integrally formed on a tip of a first spring portion 76a from among both spring portions 76a and 76b of the plate spring 76. Slanting pieces 79 and 80 are formed on a tip end of the first spring portion 76a and bent to an anti-pressurized side. The slanting pieces 79 and 80 are exposed within the opening plane of the bushing B.

On the other hand, a vis inserting hole 81 is penetrated through the second spring portion 76b of the plate spring 76 to a rear surface of the plate spring 76. In addition, an engagement/stop piece 82 is formed having a positioning hole 82a through which the positioning tongue 60b is inserted.

In the disc apparatus, both first spring portion 76a and second spring portion 76b are elastically deformed, as shown in FIG. 3, to hold the head carriage 60 with respect to the guide axle 26 and output axle 25.

Hence, since, in the embodiment described above with reference to FIGS. 3 through 6 (B), the single plate spring 76 can achieve the transmission of the driving force of the stepping motor 24 and a pressure required to maintain the magnitude of balance of the head assembly, the number of parts and labor-hour cost can be reduced.

In addition, in the embodiment shown in FIGS. 3 through 6 (B), the first spring portion 76a serves to apply the component force in the horizontal direction and the component force in the vertical direction to the head carriage 80 via the guide axle 26. This means that the pressure of the first spring portion 76a to the head carriage 61 is acted upon in the two directions.

Furthermore, in the embodiment shown in FIGS. 3 through 6 (B), the slanting pieces 79 and 80 are formed and bent toward the anti-pressure applied direction such as to be exposed within the opening plane of the bushing B. Therefore, the first spring portion 76a is elastically deformed in the direction at which the guide axle 26 is brought in contact with the slanting pieces 79 and 80 to enable the insertion of the bushing B in a case where the guide axle 26 is inserted into the bush B. In this case, the tip of the guide axle 26 is brought in contact with the slanting piece 79 (or 80) of the first spring portion 76a, as shown in FIG. 6 (A), the contacting force is acted upon the slanting piece 79 (or 80) in the downward direction as a divided force to the slanting piece 79 so that the first spring portion 76a is flexed in the downward direction, as shown in FIG. 6 (B), the guide axle 26 getting on the tongue 78.

In addition, since the tongue 78 is provided on the first spring portion 76a in the disc apparatus in the first embodiment which is brought in contact with the outer peripheral surface of the guide axle 26, contact areas of the first spring portion 76a and guide axle 26 can be reduced.

As described hereinabove, since, in the disc drive apparatus according to the present invention, the plate spring is mounted on the head carriage having the first spring portion which presses the inner peripheral surface of the axle hole on the outer peripheral surface of the guide axle juxtaposed to the output axle under pressure and the second spring portion which presses the contactor on the outer peripheral surface of the output axle under pressure, both first and second spring portions are elastically deformed so that the head carriage is retained with respect to the guide rod and output axle.

Hence, since the single plate spring can achieve the contacting force required to maintain the magnitude of balance in the head assembly and to transmit the driving force of the motor, the number of parts and number of labor-hours can be reduced so that the assembly cost can accordingly be reduced.

Since, in addition, the head carriage receives the components of force in the horizontal direction and vertical direction by means of the first spring portion, the contacting force of the first spring portion to the head carriage are acted upon in the two directions. Thus, the vibrations of the head with the clearance against the guide axle can be prevented.

Since, in addition, the slanting pieces which are exposed to the opening plane of the axle hole are formed with the first spring portion are bent in the anti-pressure contacting direction, the first spring portion is elastically deformed in a direction such that the guide axle is brought in contact with the slanting piece so as to be inserted into the axle hole when the guide axle is inserted through the axle hole. Consequently, the inserting operation of the guide axle with respect to the head carriage can be simplified.

Since, furthermore, the tongue which is brought in contact with the outer peripheral surface of the guide axle is installed on the first spring portion, a contact area between the first spring portion and guide axle can be contracted (become smaller). Therefore, a resistance force of the head carriage against the guide axle during the advance and retract operations of the head carriage can be reduced.

Figure 8:
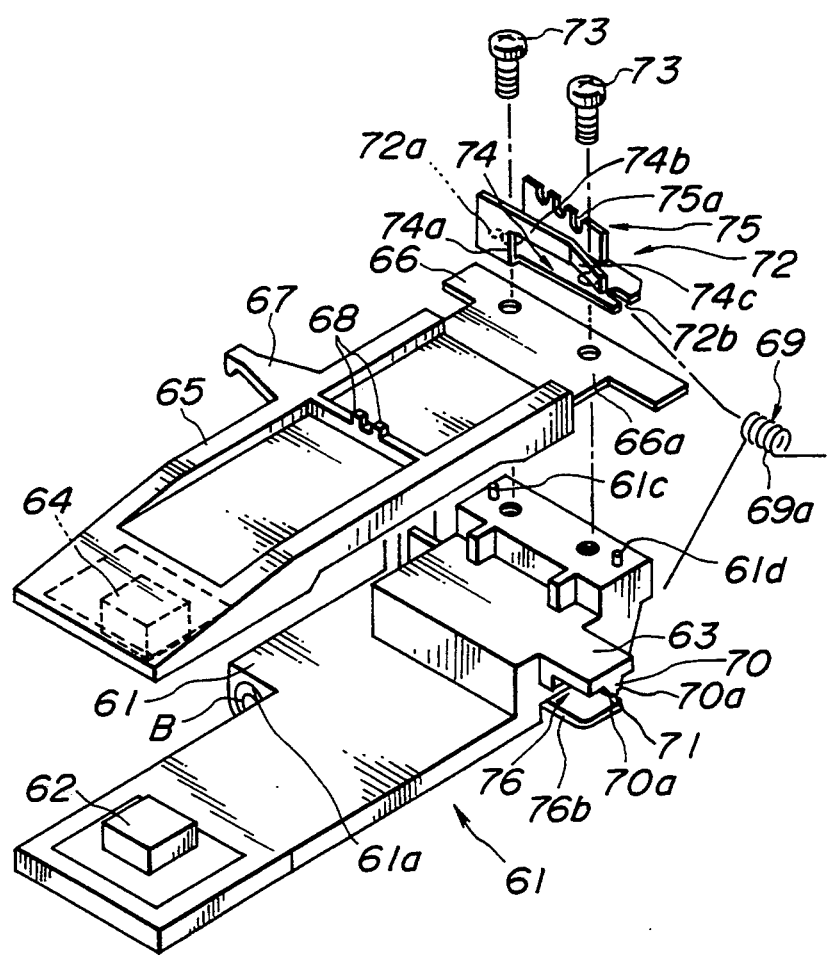
FIGS. 8, 9 (A) through 9 (C) are perspective views of the head assembly for explaining a mounting procedure of the spring in the head assembly of the disc drive apparatus according to the present invention.

Next, the mounting of the head arm 65 onto the head carriage 61 will be described below with reference to FIGS. 8 and 9.

The head arm 65 is swingably attached onto an upper side of a base end portion of the head carriage 61 via an arm mounting portion 66a of the elastic body 66, the head arm 65 having the second head 31 corresponding to the first head 30.

Numerals 61c and 61d denote positioning tongues formed integrally on the upper side of the base end portion of the head carriage 61.

The press plate 72 having the approximately rectangular shape in the plan view is fixed on an upper surface of the base end portion of the head carriage 61 via the elastic body 66 by means of the vis 73. Positioning penetrated holes 72a and cut-out 72b are installed on both side edges at the right and left sides of the press plate 72 to which the tongues 61c and 61d are exposed.

The spring mounting piece 75 is integrally mounted on the front end edge of the left side of the press plate 72. The spring mounting piece 74 includes: the rising portion 74a which is projected upward; the spring mounting portion 74b which is projected toward the right side of the rising portion 74a; and the spring inserting portion 74c which is bent in a head direction from the spring mounting portion 74b so that the spring wounding portion 69a of the torsion spring 69 is guided thereinto when the spring 69 is mounted.

The spring engagement/stop piece 75 is bent from the rear end edge center portion of the press plate 72 and is opposed to the spring mounting portion 74b of the spring mounting piece 74. The spring engagement/stop piece 75 is provided with a plurality of spring engagement/stop groove 75a corresponding to the spring engagement/stop portion 68.

In the head assembly of the disc drive apparatus constructed as described above with reference to FIGS. 8 through 9 (C), the head carriage 60 and head arm 65 are integrated by means of the press plate 72 and the spring winding portion 69a of the torsion spring 69 which pivotally biases the head arm 65 is mounted on the head carriage 60.

Hence, in the embodiment described above with reference to FIGS. 8 through 9 (C), the single member does not only function as the press plate but also functions as the mounting piece of the torsion spring 69. Consequently, the number of parts and number of labor-hours to assembly the disc drive apparatus can be reduced.

In addition, in the embodiment described above with reference to FIGS. 8 through 9 (C), the spring inserting portion 74c to guide the spring winding portion 69a of the torsion spring 69 into the press plate 72 is formed so as to be bent toward the head direction. Hence, the insertion of the spring winding portion 69a into the spring inserting portion 74c during the torsion spring mounting operation can become simple.

Next, a mounting procedure of the torsion spring onto the press plate and head arm of the head assembly will be explained with reference to FIGS. 9 (A) through 9 (C).

Figure 9:
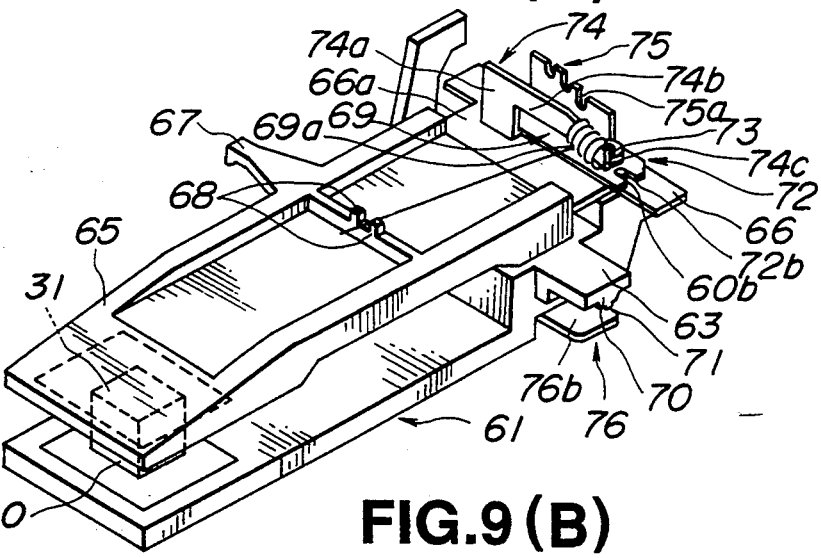
Figure 9:
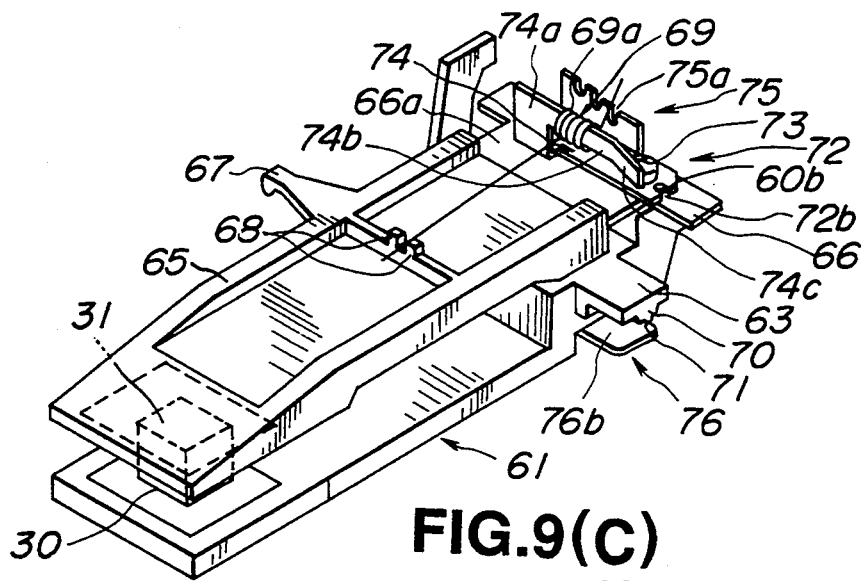
Figure 9:
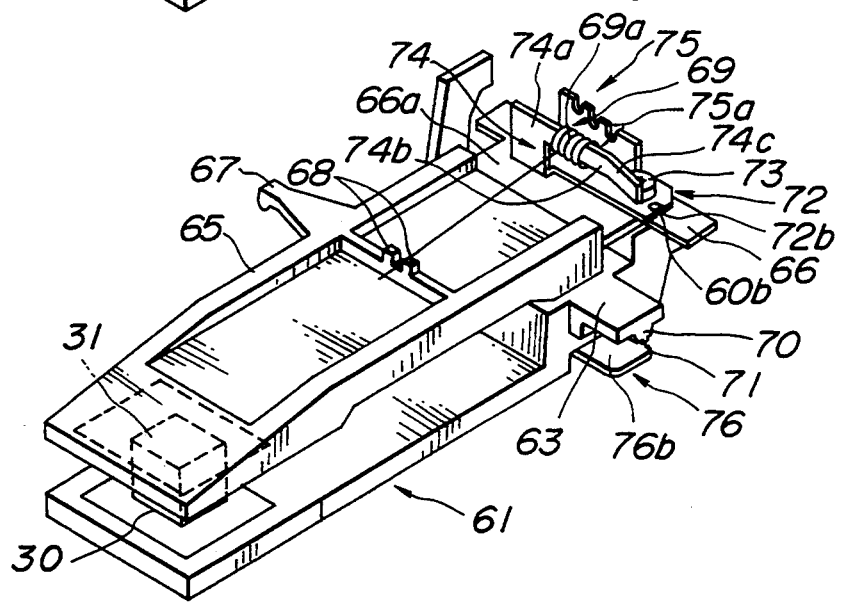

First, as shown in FIG. 9 (A), the spring winding portion 69a of the torsion spring 69 is inserted into the spring inserting portion 74c of the spring mounting piece 74 and an end portion of the torsion spring 69 is is exposed to a space between both spring engagement/stop portions 68.

Next, as shown in FIG. 9 (B), the spring winding portion 69a is moved and mounted onto the spring mounting portion 74b of the spring mounting piece 74, the other end of the torsion spring 69 being grasped by an operator.

Thereafter, as shown in FIG. 9 (C), the other end of the torsion spring 69 is engaged and held within the spring engagement/stop groove 75a of the spring engagement/stop piece 75.

In this way, the torsion spring 69 can easily be mounted on the press plate and head arm.

It is noted that although, in the embodiment, the guide width of the spring inserting portion 74c has the same dimension at any arbitrary spring inserting direction position, the guide width of the spring inserting portion (not shown) may be set to become narrower as it is directed to its tip portion so that an easier insertion of the spring winding portion 69a of the torsion spring 69 to the spring inserting portion can be made.

Although the embodiments described above are examples of the disc drive apparatus applicable to the floppy disc drive apparatus, the present invention is applicable to other disc drive apparatuses.

What is claimed is:

1. A disc drive apparatus comprising:
   a head carriage having a first read/write magnetic head mounted thereon;
   a motor;
   an output axle attached to said motor which is rotated in a bi-directional rotation in response to the drive of the motor;
   a contactor which is integrally formed with said head carriage and which is in contact with said output axle so that said contactor receives a translational force from said output axle, said head carriage being advanced and retracted by said translational force;
   a guide axle, mounted on said head carriage, penetrated through an axle hole formed by said head carriage open in a direction of advancement and retraction of said head carriage, said guide axle juxtaposed to said output axle; and
   a unitary plate spring having a first spring portion and a second spring portion, said first spring portion so constructed as to press against said guide axle to exert pressure between an inner peripheral surface of said axle hole and an outer peripheral surface of the guide axle, said second spring portion so constructed as to press against said output axle to create pressure between said contactor and said output axle.

2. A disc drive apparatus as claimed in claim 1, wherein said contactor has a surface which is in contact with said screw axle, said surface having a fluorine liquid applied thereto.

3. A disc drive apparatus as claimed in claim 1, wherein said contactor has a trapezoid-shaped cross section.

4. A disc drive apparatus as claimed in claim 1, wherein:
   said output axle and said guide axle are substantially parallel to each other, both axles linearly extending in the direction of the advancement and retraction of said head carriage, said output axle and said guide axle defining a plane which extends parallel to said head carriage; and
   said first spring portion serves to apply, to said head carriage via said guide axle, a component of force in a direction perpendicular to said plane, and a component of force in a direction parallel to said plane but perpendicular to said linear extension of said output and guide axles.

5. A disc drive apparatus as claimed in claim 1, wherein said first spring portion includes a slanted piece bent in a direction away from said guide axle.

6. A disc drive apparatus as claimed in claim 1, wherein the first spring portion is provided with a tongue which is in contact with the outer periphery of said guide axle.

7. A disc drive apparatus as claimed in claim 1 further comprising:
- an elastic body attached with a press plate on a base end portion of said head carriage wherein said press plate clamps said elastic body to said base end portion, said elastic body having an elastically deformable arm mounting portion and a head arm portion;
- a second magnetic read/write head fixed onto the head arm portion of said elastic body in a position opposite to said first head;
- a torsion spring having a winding portion; and
- a spring mounting portion on which said winding portion of said torsion spring is mounted which swingably biases the head arm portion in a direction such that the second head approaches the first head, said spring mounting portion being integrally mounted on said press plate.

8. A disc drive apparatus as claimed in claim 7, wherein said spring mounting portion includes a spring guide portion that is bent and formed in a head direction.

9. A disc drive apparatus as claimed in claim 8, wherein the width of said spring guide portion becomes narrower in a direction of a tip of said spring guide portion.

10. A disc drive apparatus comprising:
- a head carriage means for supporting a first read/write magnetic head mounted thereon;
- motor means for bi-directionally rotating an output axle;
- a contactor means integrally formed with said head carriage means for making contact with said output axle to provide translational forces to said head carriage means from said bi-directionally rotated output axle, said translational forces causing said head carriage means to be advanced and retracted;
- a guide axle, mounted on said head carriage means substantially parallel to said screw axle, which penetrates through an axle hole formed by said head carriage means open in a direction of advancement and retraction of said head carriage means, said guide axle juxtaposed to said output axle;
- a unitary plate spring having a first spring portion and a second spring portion, said first spring portion so constructed so as to press against said guide axle to exert pressure between an inner peripheral surface of said axle hole and an outer peripheral surface of the guide axle, said second spring portion so constructed so as to press against said output axle to create pressure between said contactor means and said output axle, wherein
- both of said output and guide axles linearly extend in the direction of the advancement and retraction of said head carriage means, said output axle and said guide axle defining a plane which extends parallel to said head carriage; and
- said first spring portion serves to apply, to said head carriage means via said guide axle, a component of force in a direction perpendicular to said plane, and a component of force in a direction parallel to said plane but perpendicular to said linear extension of said output and guide axles.

11. A disc drive apparatus as claimed in claim 10, wherein said contactor means has a surface which is in contact with said output axle, said surface having a fluorine liquid applied thereto.

12. A disc drive apparatus as claimed in claim 10, wherein said contactor means having a trapezoid-shaped cross section.

13. A disc drive apparatus as claimed in claim 10, wherein said first spring portion includes a slanted piece bent in a direction away from said guide axle.

14. A disc drive apparatus as claimed in claim 13, wherein the first spring portion is provided with a tongue which is in contact with the outer periphery of said guide axle.

15. A disc drive apparatus as claimed in claim 10 further comprising:
- an elastic body attached with a press plate on a base end portion of said head carriage means, said elastic body having an elastically deformable arm mounting portion and a head arm portion;
- a second magnetic read/write head fixed onto the head arm portion of said elastic body in a position opposite to said first head;
- a torsion spring having a winding portion; and
- a spring mounting portion on which said winding portion of said torsion spring is mounted which swingably biases the head arm portion in a direction such that the second head approaches the first head, said spring mounting portion being integrally mounted on said press plate.

16. A disc drive apparatus as claimed in claim 15, wherein said spring mounting portion includes a spring guide portion that is bent and formed in a head direction.

17. A disc drive apparatus as claimed in claim 16, wherein the width of said spring guide portion becomes narrower in a direction of a tip of said spring guide portion.

* * * * *